W. MOSER.
PLATE LIFTER.
APPLICATION FILED AUG. 19, 1912.
1,103,070. Patented July 14, 1914.
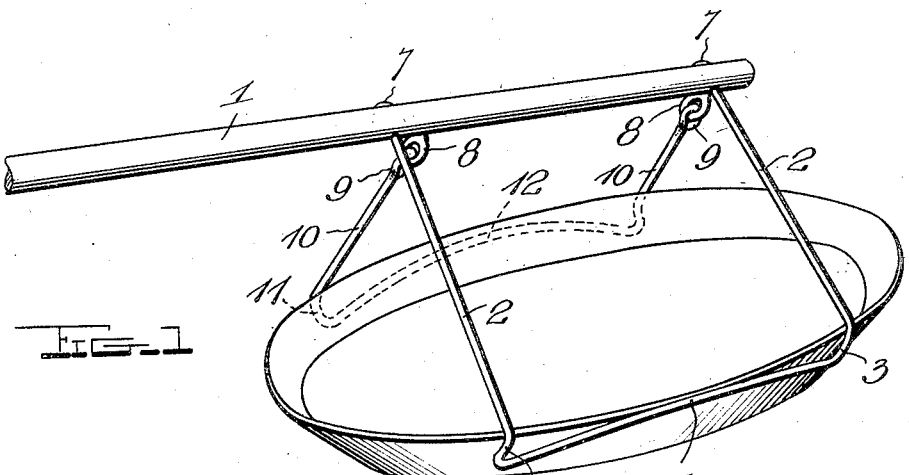
FIG. 1
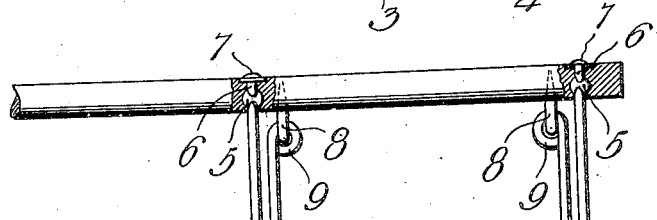
FIG. 2
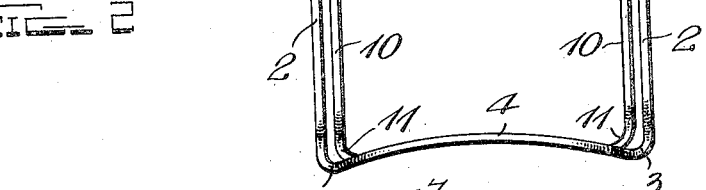
FIG. 3
Witnesses
Edwin G. McKee
Inventor
William Moser
By
Attorney

UNITED STATES PATENT OFFICE.

WILLIAM MOSER, OF ALAMOSA, COLORADO.

PLATE-LIFTER.

1,103,070.

Specification of Letters Patent. Patented July 14, 1914.

Application filed August 19, 1912. Serial No. 715,817.

*To all whom it may concern:*

Be it known that I, WILLIAM MOSER, a citizen of the United States, and a resident of Alamosa, in the county of Conejos and State of Colorado, have invented certain new and useful Improvements in Plate-Lifters, of which the following is a specification, reference being had to the accompanying drawings.

This invention relates to certain new and useful improvements in lifters employed in handling hot plates and shallow pans; and the primary object of my invention is to provide a device of this general character, of a simple and inexpensive nature, and of a durable construction, which shall be capable of convenient adjustment upon a hot pie plate, or similar dish, enabling the user to safely and conveniently place the plate into or remove the same from an oven, with ease, accuracy and despatch.

With these and other objects in view, the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which like numerals of reference indicate similar parts in the several views: Figure 1, shows a perspective view of a plate holder constructed according to my invention disclosing the same as in engagement with a pie plate. Fig. 2, shows a side view of the lifter. Fig. 3, shows an end view of the holder with the two frame members spread.

In my present invention, I provide a device including a staff, to one end of which is secured a fixed wire member and a swinging or movably secured member, also made of wire, which members are arranged to be linked over a pie plate or similar vessel, to enable the user to conveniently remove the plate from or place the same into the oven. The device is also adapted to be used in removing shallow plates or pans from a stove or range.

In carrying out the aim of my invention, I provide a staff 1, which is preferably made of wood, though the same may be made of twisted wire. In my present invention, I will describe the staff as made of wood.

This staff, 1, near one end, is provided with two parallel running openings and passing through these openings are the ends 7 of the fixed wire frame member. This frame member includes the centrally positioned and outwardly bowed portion 4, which is continued in the two straight parallel stems 2, 2. As shown in Figs. 1 and 3, each stem at its juncture with the bowed portion 4, is curved inwardly, the curved portions being marked 3. Near the ends, each stem is flattened, to provide a circular outstanding spur forming members 5. In securing the frame member to the staff these spurs are driven into the wood, as shown in Fig. 2, and so prevent displacement of these stems. At the ends, the stems receive the washers 7, these ends being flanged over the washers. From the foregoing it will be noticed that the spurs prevent displacement of the stem in one direction, and the washers in an opposite direction, this construction being clearly shown in Fig. 2.

Held adjacent to the stem members 2, and extending at an angle, are the screw eyes 8, 8, and these screw eyes are engaged by the ears 9, of a counterpart wire frame member, including the two parallel extending stems 10, which at their ends curve inward, as shown at 11, and continue in the outwardly bowed portions 12, this construction being clearly shown in Fig. 3.

In order to engage the lifter with a pie plate, the operator so holds the lifter, that the fixed frame member will be held oblique to the swinging frame member. The swinging member is then carried under the edge of the pie plate, when the staff is given a turn so as to bring the opposite bowed portion 4 below the edge of the pie plate, as is shown in Fig. 1, for instance. The lifter with the attached plate can then be conveniently handled so that the plate can be put into or removed from an oven. So also can a shallow pan be removed from the top of an oven or range.

A plate lifter constructed according to my invention is simple and inexpensive, both durable and efficient in operation and the lifter may be attached to a shallow pan or pie plate with ease, accuracy and despatch, enabling the user to safely and conveniently handle the utensil without danger of being burnt.

Having thus described my said invention, what I claim as new and desire to secure by United States Letters Patent is:

In a device of the character described a staff having two parallel running openings, in combination with a wire member having two parallel stems each near its end being flat to provide a circular outstanding spur, said ends passing through said openings, said spurs being driven into said staff, and washers upon said projecting ends, said ends being flanged over said washers, as and for the purpose set forth.

In testimony whereof I affix my signature, in presence of two witnesses.

WILLIAM MOSER.

Witnesses:
SAMUEL J. HASKINS,
FRANK PATTERSON.